United States Patent
Volkers et al.

(10) Patent No.: US 7,040,357 B1
(45) Date of Patent: May 9, 2006

(54) OIL RECEIVING AND STORAGE ASSEMBLY

(76) Inventors: Allan E. Volkers, 17 11th Street SW., St. Stephen, MN (US) 56375; George R. Welle, 17 11th Street SW., St. Stephen, MN (US) 56375; Jonathan J. Welle, 17 11th Street SW., St. Stephen, MN (US) 56375

( * ) Notice: Subject to any disclaimer, the term of this patent is extended or adjusted under 35 U.S.C. 154(b) by 183 days.

(21) Appl. No.: 10/739,695

(22) Filed: Dec. 19, 2003

(51) Int. Cl.
*B65B 1/04* (2006.01)

(52) U.S. Cl. .................. 141/86; 141/95; 141/364; 141/366

(58) Field of Classification Search ............... 141/86, 141/94, 95, 105–107, 284, 363–366, 234–237; 184/106, 1.5; 220/572, 573, 375, 663
See application file for complete search history.

(56) References Cited

U.S. PATENT DOCUMENTS

| | | | |
|---|---|---|---|
| 3,654,969 A | 4/1972 | Vazquez | |
| 4,832,095 A | 5/1989 | Bonnell | |
| 5,168,959 A | 12/1992 | Davis | |
| 5,269,354 A | 12/1993 | Koberg | |
| 5,477,897 A | 12/1995 | Scofield | |
| 5,505,295 A * | 4/1996 | Whittington | 206/223 |
| 5,540,264 A | 7/1996 | Harp | |
| 5,560,404 A * | 10/1996 | Blair et al. | 141/98 |
| D389,381 S | 1/1998 | Smith | |
| 5,884,676 A * | 3/1999 | Sage | 141/106 |

* cited by examiner

*Primary Examiner*—Timothy L. Maust

(57) ABSTRACT

An oil receiving and storage assembly includes a housing having a bottom wall, a peripheral wall and a top wall. The peripheral wall includes a front wall, a back wall, a first side wall and a second side wall. The top wall has a plurality of apertures extending therethrough and into the housing. A window is positioned in the front wall and generally extends between the top and bottom walls. Volume measurement indicia are positioned on the front wall and adjacent to the window. An outlet conduit has a first end and a second end. The outlet conduit is elongated and is flexible. The first end is fluidly coupled to the housing. Each of a plurality of spouts fluidly coupled to oil containers may be extended into one of the apertures such that the oil containers rest in an inverted position and the contents thereof drain into the housing.

16 Claims, 2 Drawing Sheets

OIL RECEIVING AND STORAGE ASSEMBLY

BACKGROUND OF THE INVENTION

1. Field of the Invention

The present invention relates to oil holding devices and more particularly pertains to a new oil holding device for receiving and storing oil remaining within an oil container after a majority of the oil has been removed from the oil container.

2. Description of the Prior Art

The use of oil holding devices is known in the prior art. While these devices fulfill their respective, particular objectives and requirements, the need remains for a device that conveniently holds containers in an inverted manner such that all remaining oil within may be disposed within a housing for later use. Such a device should also include an indicator for determining the amount of oil being stored.

SUMMARY OF THE INVENTION

The present invention meets the needs presented above by generally comprising a housing having a bottom wall, a peripheral wall and a top wall. The peripheral wall includes a front wall, a back wall, a first side wall and a second side wall. The top wall has a plurality of apertures extending therethrough and into an interior of the housing. A window is positioned in the front wall and generally extends between the top and bottom walls. Volume measurement indicia are positioned on the front wall and adjacent to the window. An outlet conduit has a first end and a second end. The outlet conduit is elongated and is flexible. The first end is fluidly coupled to the housing. Each of a plurality of spouts fluidly coupled to oil containers may be extended into one of the apertures such that the oil containers rest in an inverted position and the contents thereof drain into the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
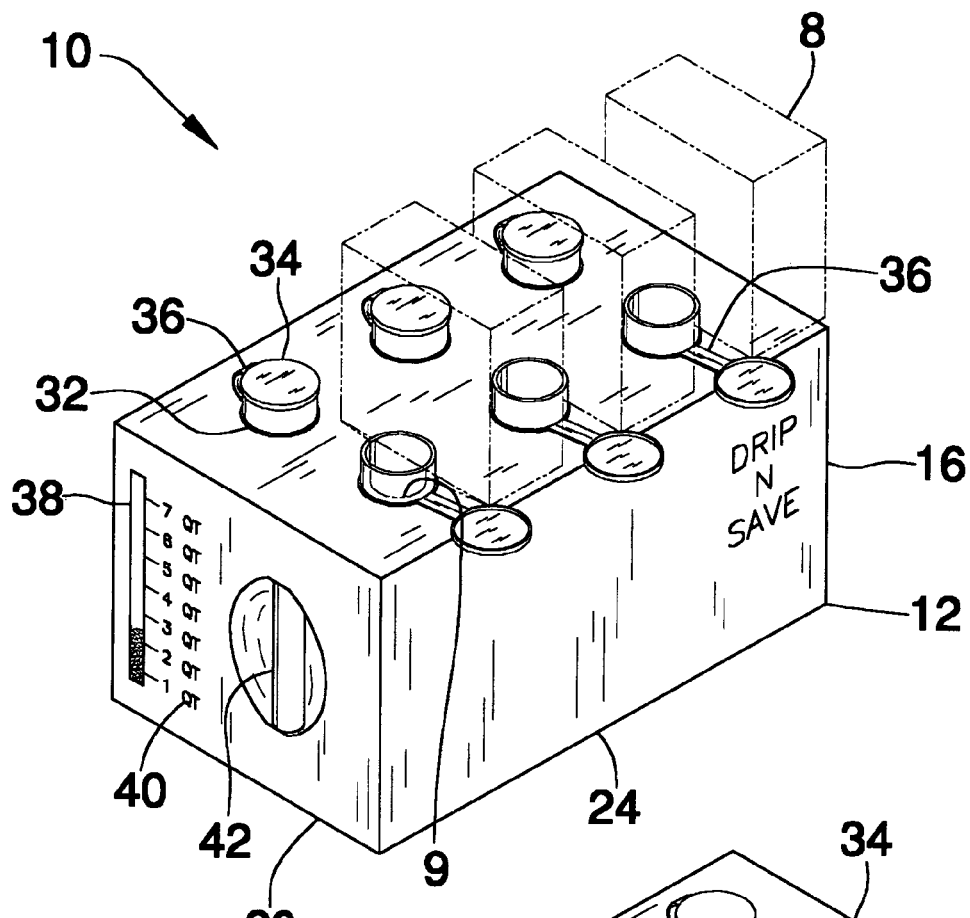
FIG. 1 is a schematic front perspective view of a oil receiving and storage assembly according to the present invention.
Figure 2:
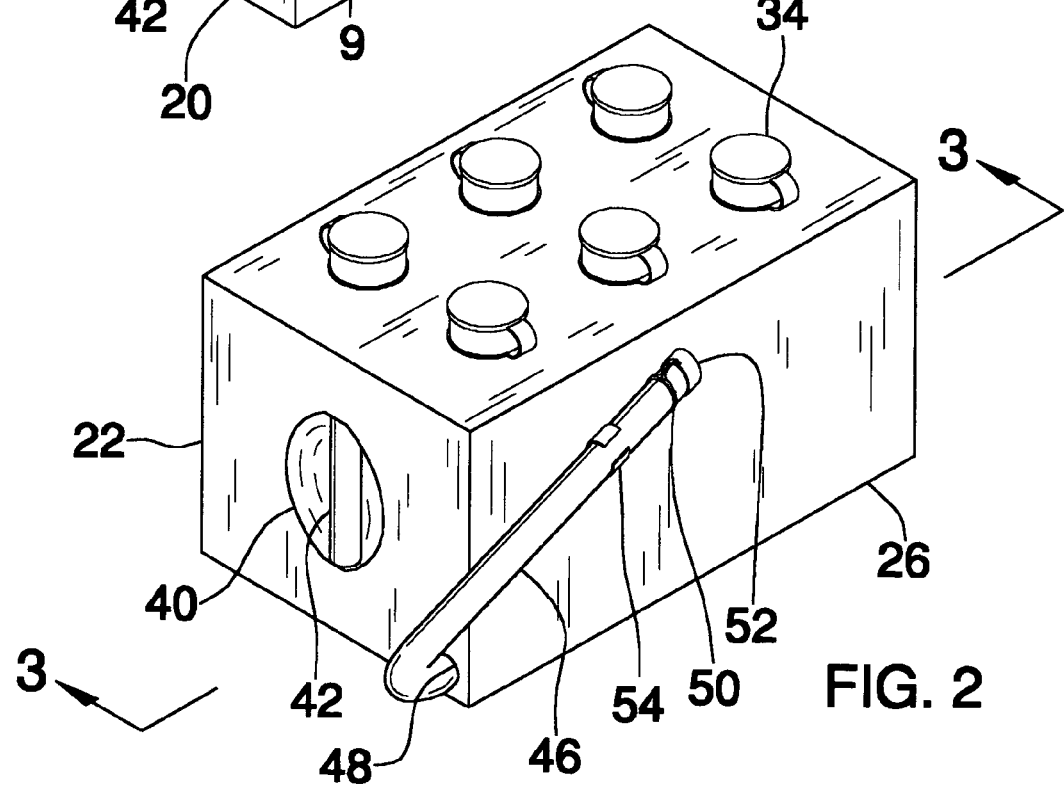
FIG. 2 is a schematic back perspective view of the present invention.
Figure 3:
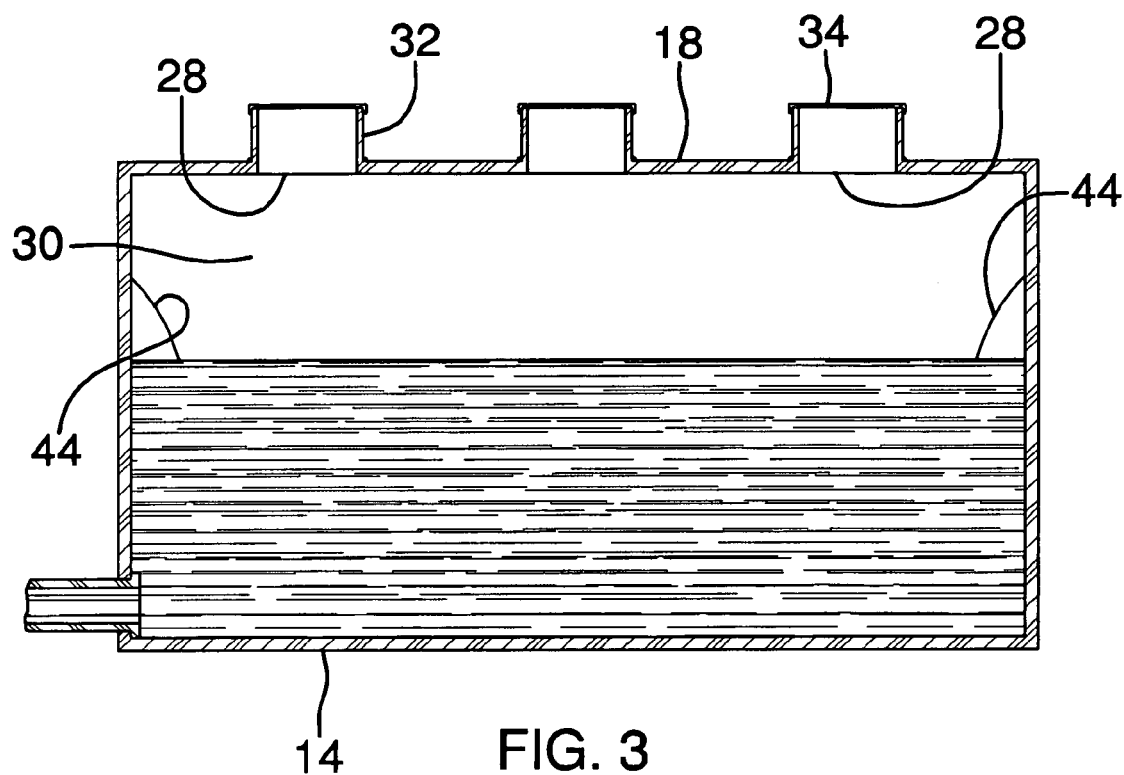
FIG. 3 is a schematic cross-sectional view taken along line 3—3 of FIG. 2 of the present invention.
Figure 4:
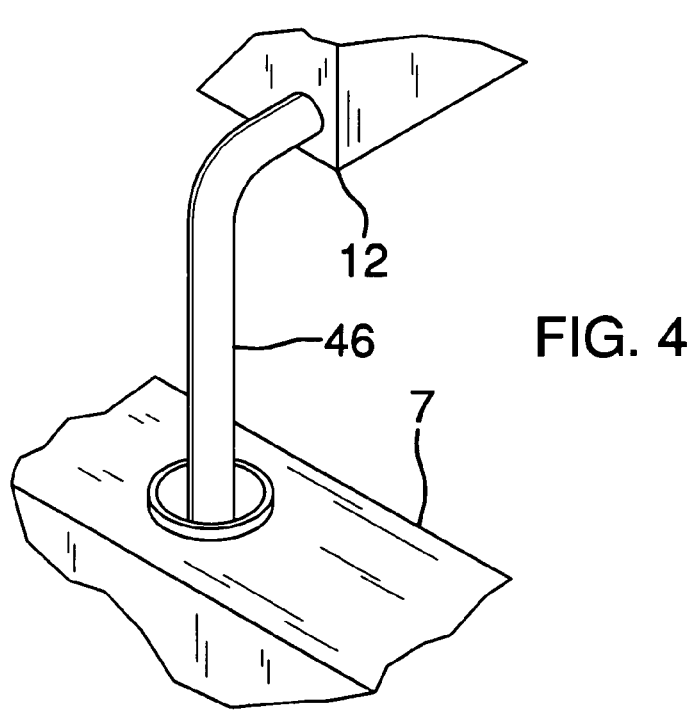
FIG. 4 is a schematic perspective view of the conduit of the present invention.

With reference now to the drawings, and in particular to FIGS. 1 through 4 thereof, a new oil holding device embodying the principles and concepts of the present invention and generally designated by the reference numeral 10 will be described.

As best illustrated in FIGS. 1 through 4, the oil receiving and storage assembly 10 generally comprises an oil collection device for holding oil drained from a plurality of oil containers 8 and for supporting those containers 8 in an inverted manner such that any oil left therein will drain into the assembly 10.

The assembly 10 includes a housing 12 having a bottom wall 14, a peripheral wall 16 and a top wall 18. The peripheral wall 16 includes a front wall 20, a back wall 22, a first side wall 24 and a second side wall 26. The top wall 18 has a plurality of apertures 28 extending therethrough and into an interior 30 of the housing 12. The apertures 28 are aligned in a first row and a second row. Each of the first and second rows is orientated generally parallel to a plane of the first side wall 24. The first row is spaced from the second row. Each of the apertures 28 in the first row is aligned with one of the apertures 28 in the second row along a line orientated perpendicular to the first side wall 24. Preferably, the rows each include three apertures 28. The apertures 28 each have preferably have a diameter substantially equal to 1¼ inches. This diameter is consistent with receiving the spout 9 of a conventional oil container 8. Each of the apertures 28 in the first row is positioned between 1 inch and 1¼ inch from the first side wall 24 and each of the apertures 28 in the second row is positioned between 1 inch and 1¼ inch from the second side wall 26. The apertures 28 in the first row are spaced about 2¼ inches from the apertures 28 in the second row. Preferably, each of the fist and second side walls 24, 26 has length generally equal to about 9 inches and a height generally equal to about 7 inches. The top wall 18 has a width generally equal to about 7 inches.

Each of a plurality of rims 32 is attached to and extends upwardly from a peripheral edge of each the apertures 28. The rims 32 each have a thickness of about ¼ inch and a height equal to about 1 inch. Each of a plurality of covers 34 has a size and shape for removably coupling to one of the rims 32 and closing an associated one of the apertures 28. The covers 34 are preferably attached to the rims 32 with a flexible arm 36.

A window 38 is positioned in the front wall 20 and generally extends between the top 18 and bottom 14 walls. Volume measurement indicia 40, preferably in quarts, are positioned on the front wall 20 and adjacent to the window 38. The window 38 may be constructed from a clear plastic or glass material for viewing into the interior 30 of the housing 12.

Each of a pair of handles 42 is attached to the housing 12. Each of the handles 42 is positioned on one of the front 20 and back 22 walls. Ideally, the handles 42 are positioned in one of a pair of concave depressions 44 extending into each of the front 20 and back 22 walls. The handles 42 are preferably vertical rods positioned within the depressions.

An outlet conduit 46, formed by a tube, has a first end 48 and a second end 50. The outlet conduit 46 is elongated and is flexible. The first end 48 is fluidly coupled to the housing 12 and is positioned on the peripheral wall 16. The first end 48 is positioned generally adjacent to the bottom wall 14. A cap 52 is removably positioned over the second end 50 of the conduit 46 for selectively opening or closing the conduit 46.

A coupler 54 is attached to the peripheral wall 16 for selectively attaching a section of the coupler 54 to the housing 12. The coupler 54 is positioned generally adjacent to the top wall 18. The coupler 54 is preferably a conventional clip. The positioning of the first end 48 ensures that a majority of the oil may be removed from the housing 12 when needed while the position of the coupler 54 aids in the prevention of oil spills through the second end 50.

In use, each of a plurality of the spouts 9, which are fluidly coupled to the oil containers 8, may be extended into one of the apertures 28 such that the oil containers 8 rest in an inverted position. In this position, any remaining oil within the containers 8 drains out and into the housing 12. The positioning of the apertures 28 is such that a plurality of containers 8 may be drained simultaneously. When a sufficient amount of oil has been collected, it may be pouted into an engine block 7 by way of the conduit 46.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An oil collection device for holding oil drained from a plurality of oil containers, said device comprising:
    a housing having a bottom wall, a peripheral wall and a top wall, said peripheral wall including a front wall, a back wall, a first side wall and a second side wall, said top wall having a plurality of apertures extending therethrough and into an interior of said housing, said apertures being aligned in a first row and a second row, each of said first and second rows being orientated generally parallel to a plane of said first side wall, said first row being spaced from said second row;
    a plurality of rims, each of said rims being attached to and extending upwardly from a peripheral edge of each of said apertures;
    a plurality of covers, each of said covers having a size and shape for removably coupling to one of said rims and closing an associated one of said apertures;
    a window being positioned in said front wall and generally extending between said top and bottom walls, volume measurement indicia being positioned on said front wall and adjacent to said window;
    an outlet conduit having a first end and a second end, said outlet conduit being elongated and being flexible, said first end being fluidly coupled to said housing; and
    wherein each of a plurality of spouts fluidly coupled to the oil containers may be extended into one of said apertures such that the oil containers rest in an inverted position and the contents thereof may drain into said housing.

2. The device of claim 1, wherein each of said apertures in said first row are aligned with one of said apertures in said second row along a line orientated perpendicular to said first side wall.

3. The device of claim 2, wherein each of said first and second rows includes three apertures.

4. The device of claim 1, wherein each of said apertures has a diameter substantially equal to 1¼ inches.

5. The device of claim 4, wherein each of said apertures in said first row being positioned between 1 inch and 1¼ inch 1 from said first side wall, each of said apertures in said second row being positioned between 1 inch and 1¼ inch from said second side wall.

6. The device of claim 5 wherein said apertures in said first row being spaced about 2¼ inches from said apertures in said second row.

7. The device of claim 1, further including each of a pair of handles being attached to said housing, each of said handles being positioned on one of said front and back walls.

8. The device of claim 7, wherein each of said handles is positioned in one of a pair of concave depressions extending into each of said front and back walls.

9. The device of claim 1, wherein said first end or said outlet is positioned on said peripheral wall and is positioned generally adjacent to said bottom wall.

10. The device of claim 9, further including a cap being removably positioned over said second end of said conduit for selectively opening or closing said conduit.

11. The device of claim 9, further including a coupler being attached to said peripheral wall for selectively attaching a section of said coupler to said housing, said coupler being positioned generally adjacent to said top wall.

12. An oil collection device for holding oil drained from a plurality of oil containers, said device comprising:
    a housing having a bottom wall, a peripheral wall and at top wall, said peripheral wall including a front wall, a back wall, a first side wall and a second side wall, said top wall having a plurality of apertures extending therethrough and into an interior of said housing, said apertures being aligned in a first row and a second row, each of said first and second rows being orientated generally parallel to a plane of said first side wall, said first row being spaced from said second row, each of said apertures in said fist row being aligned with one of said apertures in said second row along a line orientated perpendicular to said first side wall, each of said rows including three apertures, each of said apertures having a diameter substantially equal to 1¼ inches, each of said apertures in said first row being positioned between 1 inch and 1¼ inch from said first side wall, each of said apertures in said second row being positioned between 1 inch and 1¼ inch from said second side wall, said apertures in said first row being spaced about 2¼ inches from said apertures in said second row;
    a plurality of rims, each of said rims being attached to and extending upwardly from a peripheral edge of each of said apertures;
    a plurality of covers, each of said covers having a size and shape for removably coupling to one of said rims and closing an associated one of said apertures;
    a window being positioned in said front wall and generally extending between said top and bottom walls, volume measurement indicia being positioned on said front wall and adjacent to said window;
    each of said pair of handles being attached to said housing, each of said handles being positioned on one of said front and hack walls, each of said handles being positioned in one of a pair of concave depressions extending into each of said front and back wails;

an outlet conduit having a first end and a second end, said outlet conduit being elongated and flexible, said first end being fluidly coupled to said housing, said first end being positioned on said peripheral wall and being positioned generally adjacent to said bottom wall, a cap being removably positioned over said second end of said conduit for selectively opening or closing said conduit;

a coupler being attached to said peripheral wall or selectively attaching a section of said coupler to said housing, said coupler being positioned generally adjacent to said top wall; and wherein each of a plurality of spouts fluidly coupled to the oil containers may be extended into one or said apertures such that the oil containers rest in an inverted position and the contents thereof may drain into said housing.

13. An oil collection device for holding oil drained from a plurality of oil containers, said device comprising:

a housing having a bottom wall, a peripheral wall and a top wall, said peripheral wall including a front wall, a back wall, a first side wall and a second side wall, said top wall having a plurality of apertures extending therethrough and into an interior of said housing, said apertures being aligned in a first row and a second row, each of said first and second rows being orientated generally parallel to a plane of said first side wall, said first row being spaced from said second row;

a window being positioned in said front wall and generally extending between said top and bottom walls, volume measurement indicia being positioned on said front wall and adjacent to said window;

an outlet conduit having a first end and a second end, said outlet conduit being elongated and being flexible, said first end being fluidly coupled to said housing, said first end of said outlet being positioned on said peripheral wall and is positioned generally adjacent to said bottom wall;

a coupler being attached to said peripheral wall for selectively attaching a section of said coupler to said housing, said coupler being positioned generally adjacent to said top wall;

a cap being removably positioned over said second end of said conduit for selectively opening or closing said conduit; and wherein each of a plurality of spouts fluidly coupled to the oil containers may be extended into one of said apertures such that the oil containers rest in an inverted position and the contents thereof may drain into said housing.

14. The device of claim 13, wherein each of said apertures in said first row are aligned with one of said apertures in said second row along a line orientated perpendicular to said first side wall.

15. The device of claim 13, further including a plurality of rims, each of said rims being attached to and extending upwardly from a peripheral edge of each of said apertures, a plurality of covers, each of said covers having a size and shape for removably coupling to one of said rims and closing an associated one of said apertures.

16. The device of claim 13, further including each of a pair of handles being attached to said housing.

\* \* \* \* \*